(12) United States Patent
Leonard et al.

(10) Patent No.: US 9,001,311 B2
(45) Date of Patent: Apr. 7, 2015

(54) USING PARALLAX IN REMOTE SENSING TO DETERMINE CLOUD FEATURE HEIGHT

(71) Applicant: DigitalGlobe, Inc., Longmont, CO (US)

(72) Inventors: Victor H. Leonard, Brighton, CO (US); Francis W. Gerlach, Westminster, CO (US)

(73) Assignee: DigitalGlobe, Inc., Longmont, CO (US)

( * ) Notice: Subject to any disclaimer, the term of this patent is extended or adjusted under 35 U.S.C. 154(b) by 48 days.

(21) Appl. No.: 13/835,804

(22) Filed: Mar. 15, 2013

(65) Prior Publication Data

US 2014/0268094 A1 Sep. 18, 2014

(51) Int. Cl.
*G01C 3/08* (2006.01)

(52) U.S. Cl.
CPC ...................................... *G01C 3/085* (2013.01)

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,289,397 | A | * | 9/1981 | Itzkan et al. | 356/5.01 |
| 8,411,267 | B2 | * | 4/2013 | Normand | 356/300 |
| 2009/0051926 | A1 | * | 2/2009 | Chen | 356/511 |

* cited by examiner

*Primary Examiner* — Luke Ratcliffe
(74) *Attorney, Agent, or Firm* — Robert G. Crouch; Marsh Fischmann & Breyfogle LLP

(57) ABSTRACT

Techniques for using small parallax angles in remote sensing to determine cloud feature height include exploiting two identical medium-resolution SWIR bands with parallax to estimate cloud edge feature heights well enough to enable assessments of the impacts of shadows and proximate cloud scattering on ground illumination, and hence, on reflectance calculations. The bands are intentionally designed to have a suitable parallax angle, in one embodiment approximately 1.5 degrees. With this parallax, one band will see more ground pixels than the other band as they encounter a leading edge of a cloud and the other band will see more ground pixels than the one band as they encounter the lagging edge of the cloud. From these numbers of pixels, the height of the leading and lagging edges of the cloud can be determined.

27 Claims, 10 Drawing Sheets

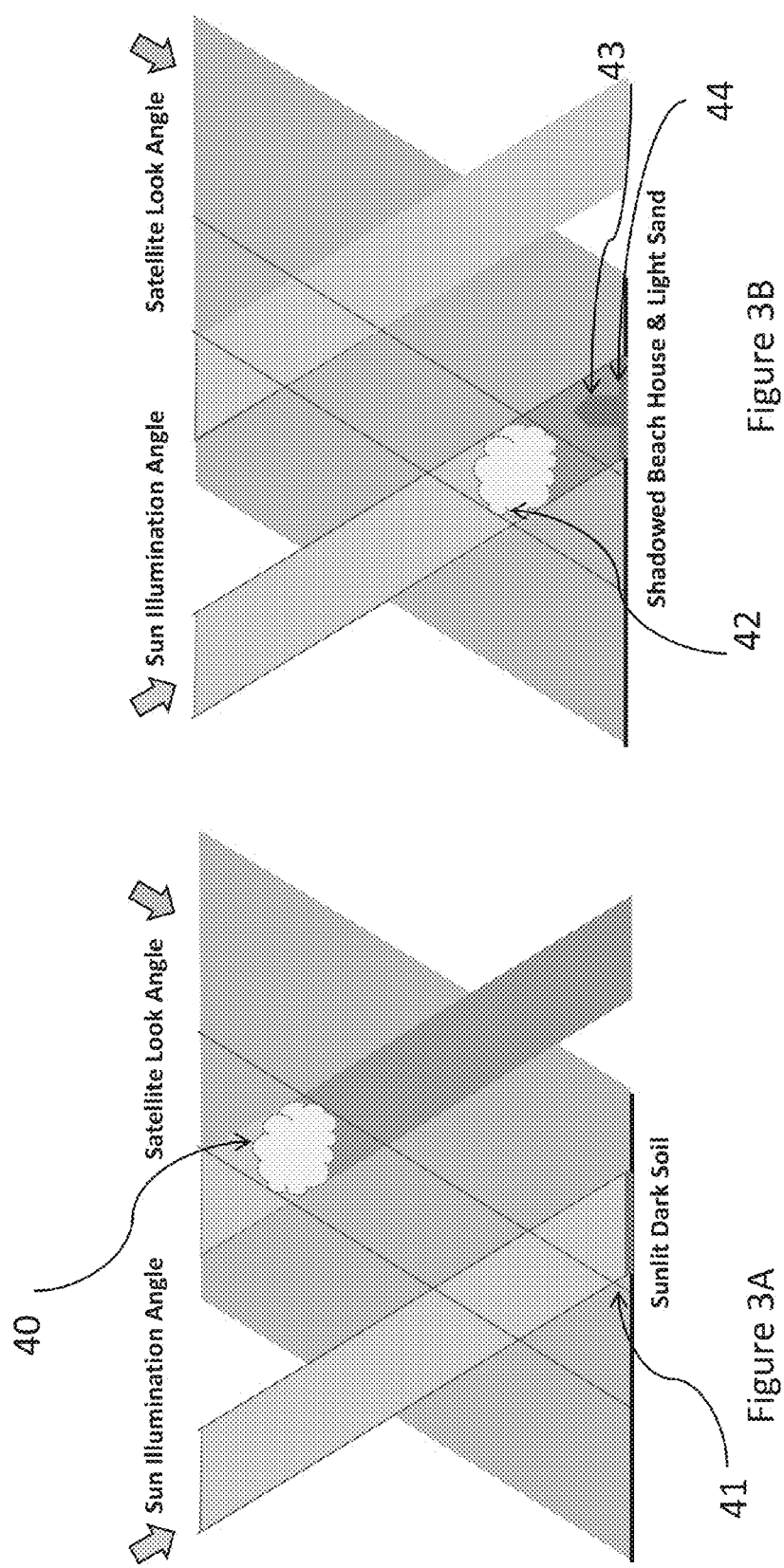

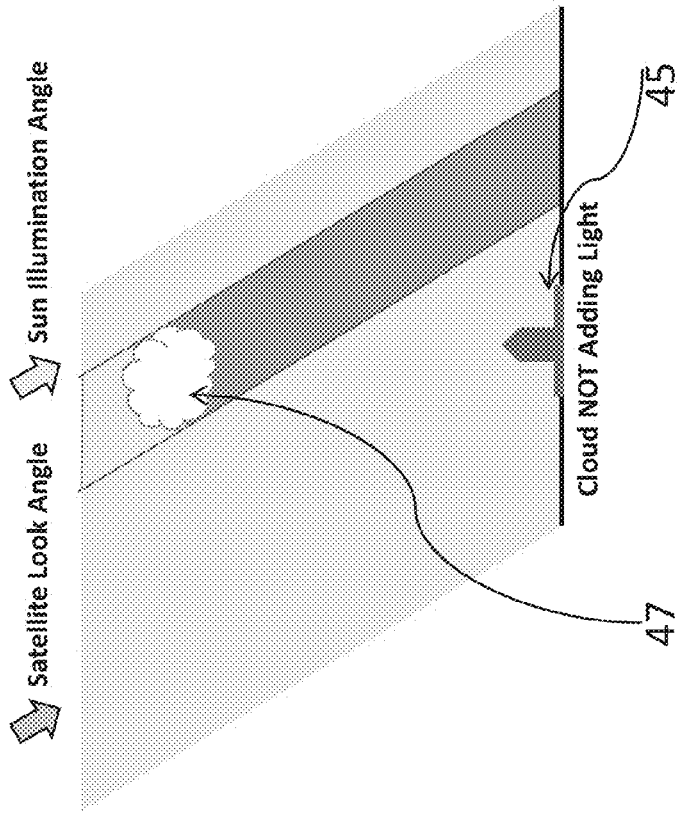
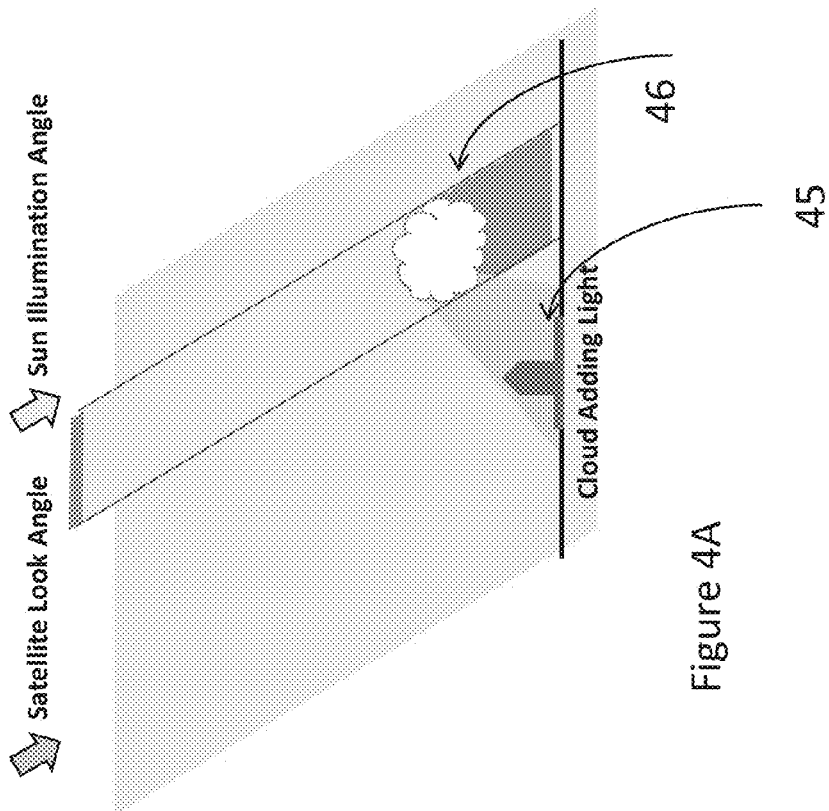
Figure 4B
Figure 4A

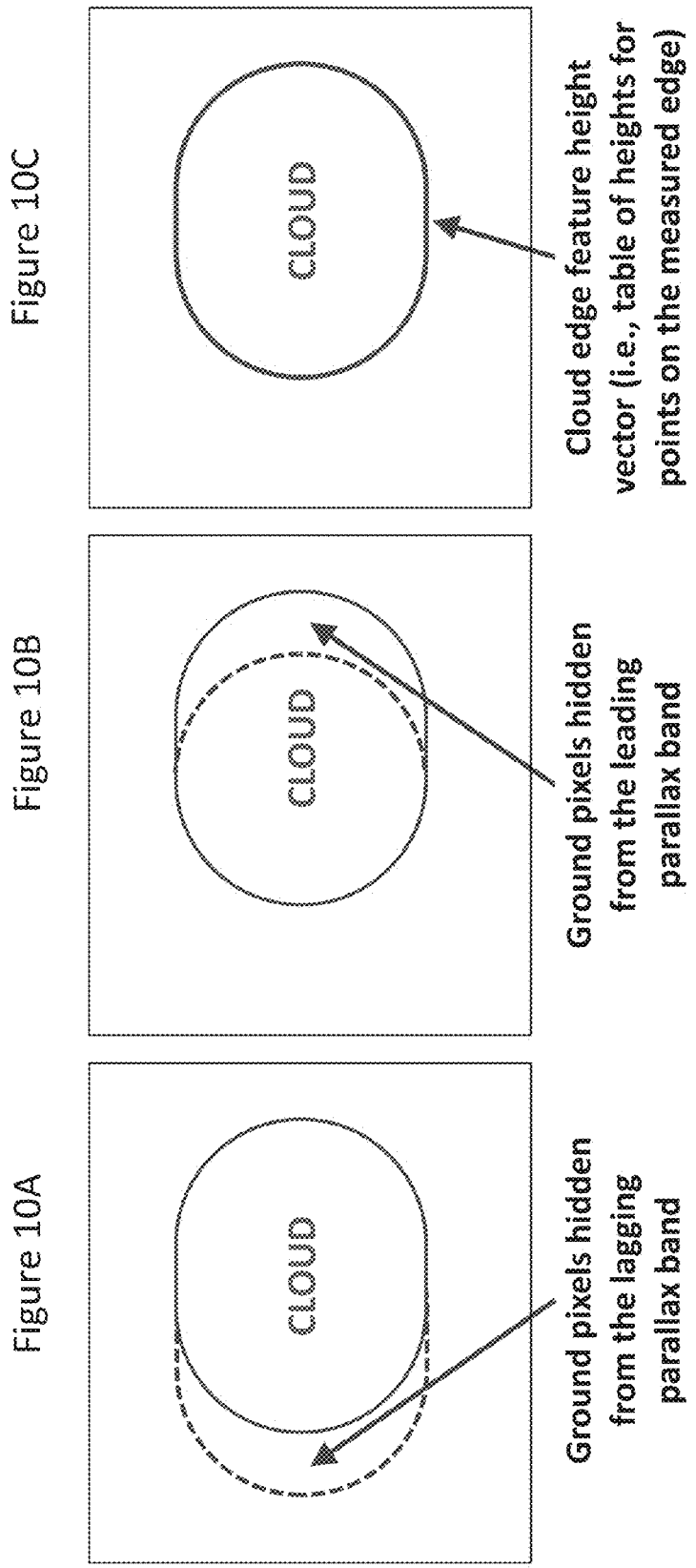

US 9,001,311 B2

USING PARALLAX IN REMOTE SENSING TO DETERMINE CLOUD FEATURE HEIGHT

BACKGROUND

The use of satellite-based and aerial-based imagery is popular among government and commercial entities. One of the challenges in obtaining high quality images of the earth is the presence of the atmosphere between the surface of the earth and the satellite collecting the image. This atmosphere has water vapor and aerosols therein that can cause the scattering of light, as well as clouds that can occlude ground areas that otherwise might be images. In addition, clouds can also block sunlight from directly illuminating areas that are being imaged.

SUMMARY

Disclosed herein is a method of determining the height above ground of an object in the sky. The method includes collecting light energy from a position above the surface of the Earth from a first direction; collecting light energy from a position above the surface of the Earth from a second direction, wherein the first direction is not parallel to the first direction; comparing the light energy from the first direction and the second direction to determine when an object in the sky is encountered, and determining a measure of the difference between the light energy from the two directions when the object is encountered; and calculating the height of the object based on the measure of the difference.

The light energy collected from the two directions may be of approximately the same wavelength. The light energy may be in the SWIR range of the electromagnetic spectrum. The substantial majority of the light energy collected may be between 2100 and 2250 nanometers in wavelength. The angle between the first and second directions may be less than 5 degrees, between 0.4 and 2.5 degrees, between 1.0 and 2.0 degrees, or approximately 1.5 degrees.

Each of the collecting operations may be performed by at least one row of multiple, separate pixels, there being at least one row for the collecting in the first direction and at least one row for the collecting in the second direction.

The comparing operation may include comparing the light energy from the first direction and the second direction to determine when a leading edge of an object in the sky is encountered, and determining a measure of the difference between the light energy from the two directions when the leading edge is encountered; comparing the light energy from the first direction and the second direction to determine when a lagging edge of an object in the sky is encountered, and determining a measure of the difference between the light energy from the two directions when the lagging edge is encountered; wherein the calculating operation includes calculating the height of the leading edge of the object based on the measure of the difference between the light energy from the two directions when the leading edge is encountered; and calculating the height of the lagging edge of the object based on the measure of the difference between the light energy from the two directions when the lagging edge is encountered.

The method may further include interpolating the height between the calculated height of the leading edge and the calculated height of the lagging edge. The object may be a cloud. The method may further include forming a cloud edge feature height vector. The determining operation of the comparing operation may include determining the number of pixels on the ground that can be seen in one of the first and second directions that cannot be seen on the ground in the other of the directions. The pixel determination may include determining to an amount less than one pixel.

Also disclosed herein is a method of determining the height of a cloud. The method includes providing a pair of radiant energy sensors at a height greater than the cloud, the sensors being directed toward the cloud at a small parallax angle relative to each other, the parallax angle being less than 5 degrees; receiving radiant energy with the sensors; and comparing the radiant energy received by the two sensors to determine the height of the cloud.

The pair of sensors may be in a single satellite. The satellite may be flying in a low Earth orbit. The pair of sensors may be in a single aircraft. The aircraft may be an unmanned vehicle.

BRIEF DESCRIPTION OF THE DRAWINGS

The disclosure herein is described with reference to the following drawings, wherein like reference numbers denote substantially similar elements:

FIGS. 3A and 3B are simplified illustrations showing dark soil being directly illuminated by the sun and imaged by the satellite (3A) and light sand and a beach house in the shadow of a cloud so that it is not directly illuminated by the sun (3B).

FIGS. 4A and 4B are simplified illustrations showing a cloud that is neither occluding imaging a particular ground area nor blocking direct illumination from the sun, but in one case (4A) is at a sufficiently low height level to reflect sunlight toward the ground area and in another case (4B) is at a sufficiently high height level to have little effect on the imaging.

FIGS. 10A, 10B, and 10C are a simplified illustration of the relationship of hidden pixels to the final Cloud Edge Feature Height Vector.

DETAILED DESCRIPTION

Figure 1:
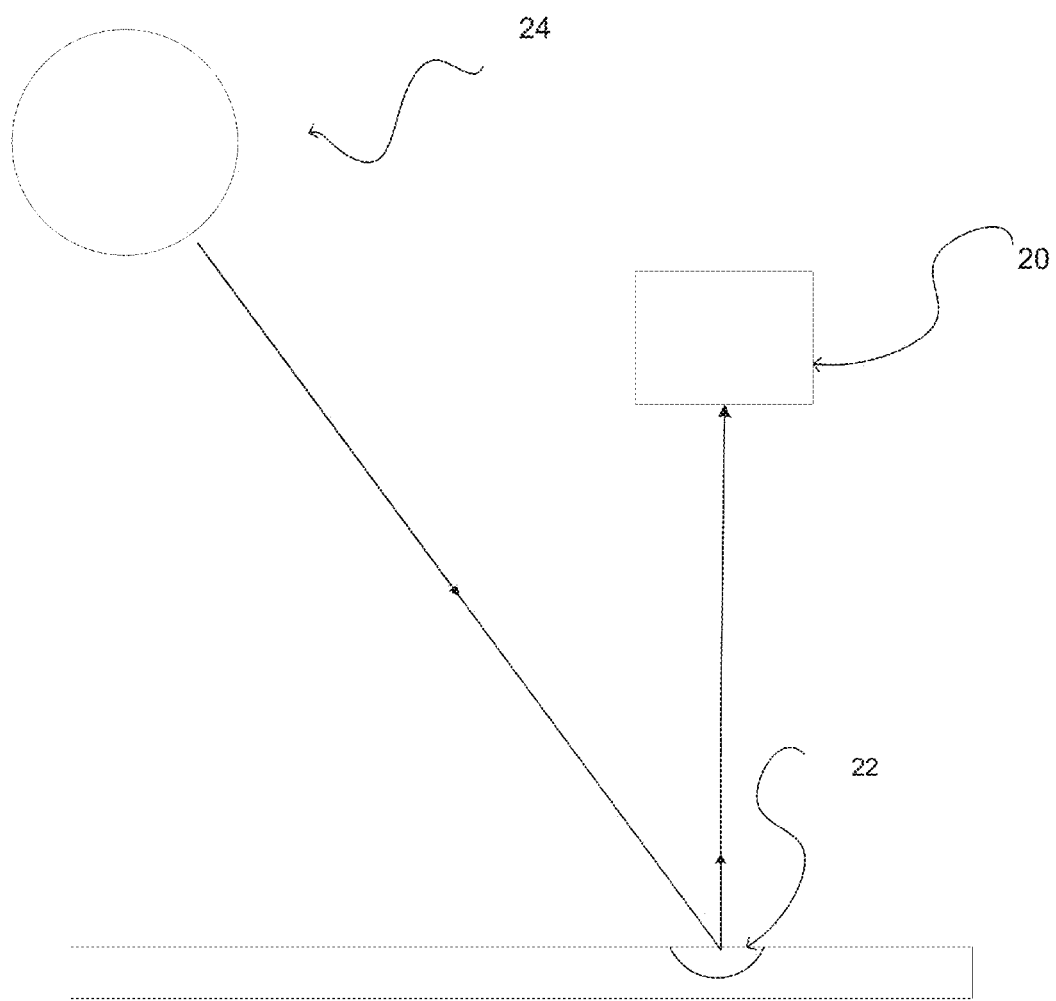
FIG. 1 is an illustration of a platform such as a satellite obtaining images of portions of the surface of the Earth receiving illumination from the sun.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

FIG. 1 shows a platform 20, such as a satellite, sensing light coming thereto from the direction of a target 22. The image sensor in the satellite or aerial vehicle measures the radiance (light energy) received at the sensor. Of course, the radiance received is a function of the position of the sun 24, the position of the satellite, the atmosphere conditions (including the presence of clouds) and other factors. It is desirable to instead have the surface reflectance as opposed to the radiance received at the satellite, as it is a better indicator of the ground area to know how it reflects light as compared to how the ground area looks from the top-of-the-atmosphere with all the various atmospheric parameters affecting the image.

Accurate imagery reflectance calculation and material classification in the presence of clouds can be enhanced by knowing the height and proximity of clouds in relation to ground targets, the sun and the imaging system. With knowledge of the presence, location, and height of clouds, the clouds can be compensated or adjusted for in the radiance to reflectance calculations. Without knowledge of the presence of clouds, there can be significant misclassification between (a) normally brighter (higher reflecting) materials in cloud shadows and (b) normally darker (lower reflecting) materials in direct sunlight. Regardless of whether or not ground targets are directly sunlit but have ground structure shadows (e.g., from nearby buildings or trees) or are in cloud shadow, proximate clouds can alter the illumination function, further exacerbating reflectance computations and material classification.

There are many contexts where it is desirable to correct as many pixels as possible in imagery ranging from essentially cloud-free to medium percentage of clouds. Depending upon the relative orientation between targets, clouds, the sun and the image sensor, there can be a significant loss of usable pixels due to the shadow and proximity effects.

Figure 2:
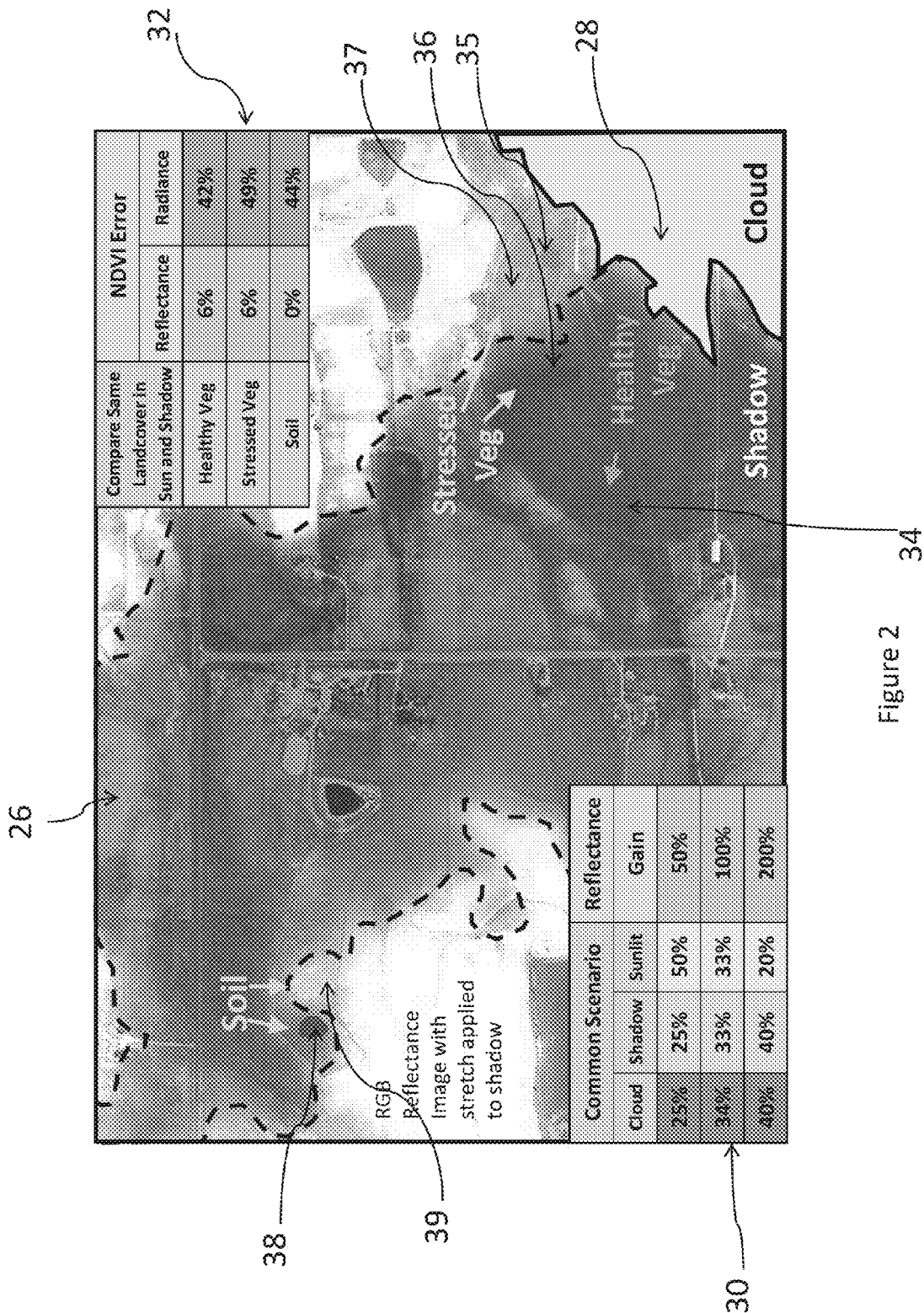
FIG. 2 is an image of a land area, in which portions of the image are occluded by clouds, portions are directly illuminated by the sun, and portions are not occluded by a cloud but are in the shadow of a cloud so that the area is not receiving direct solar illumination.

For agricultural images, vegetative indices (e.g., NDVI, as discussed below) can misbehave very badly in shadows as shown in FIG. 2. FIG. 2 shows a ground area 26, portions of which are largely occluded by clouds 28 and portions of which are not occluded, but which are in the shadow of a cloud so that those areas are not directly illuminated by the sun. The small table 30 in the lower left of the drawing shows that for a given percentage of cloud coverage, the typical amount of image area that is not occluded but is in a shadow and the typical amount of image area that is not occluded and is directly illuminated by the sun. This table helps to demonstrate that if sufficient information were known about the clouds to identify which areas were in cloud shadows (so that shadow compensation could be performed), then not only would the sunlit areas be usable but so would the cloud shadow areas.

Specifically, for a 40% cloudy day, there can be as few as 20% useable (sunlit) pixels if shadows are not corrected for and the image sensor in the satellite is looking from a different direction than along the solar vector. Of course, if the image sensor is looking along or near the solar vector, then there will be little in the way of cloud shadow pixels. Back to the example, if the 40% of the pixels in cloud shadow can be compensated for the fact that they are not being directly illuminated, then the usable number of pixels is increased from 20% of the pixels to 60% of the pixels, for a gain of 200%.

FIG. 2 also shows a small table 32 in an upper right corner thereof that shows the amount of error in the Normalized Difference Vegetation Index (NDVI) from comparing a portion of an image of various types of land cover (healthy vegetation 34 and 35, stressed vegetation 36 and 37, and soil 38 and 39) in cloud shadow versus in direct sun, respectively. As is well known, the NDVI is a quantity between −1.0 and 1.0 as governed by the following equation:

$$NDVI = \frac{(NIR - RED)}{(NIR + RED)} \quad \text{(Equation 1)}$$

where NIR is the spectral reflectance in the near infrared band; and

RED is the spectral reflectance in the red band

As can be seen in the afore-mentioned table in FIG. 2, the NDVI error in radiance between the sunlit and cloud shadow pixels is substantial in radiance and much less so in reflectance.

Knowing the cloud height helps improve classification accuracy by enabling adjustment of the illumination function when combined with reflectance correction. FIGS. 3A and 3B show a case where sunlit dark soil (3A) might have the same spectral appearance as light sand and an appropriately light beach house in the shadow of a cloud (3B). In FIG. 3A, there is a cloud 40 in the drawing, but it neither occludes the satellite's view of the area of sunlit dark soil 41 nor blocks sunlight from directly illuminating the area of dark soil 41. In FIG. 3B, a cloud 42 does block sunlight from directly illuminating the light beach house 43 and light sand 44. One of the points of this illustration is to show that two different land cover types in two different cloud scenarios may produce radiance and reflectance values that are very similar. Knowing the altitude of clouds in an image can greatly improve characterization of portions of the image that are not blocked from observation, but which may be blocked from solar illumination.

Knowing cloud proximity also helps with subtle classification accuracy by properly accounting for additional illumination from a nearby cloud, which by the way, may be blocking some of the bluish illumination from the sky.

FIGS. 4A and 4B show a case where knowing the cloud height helps to better understand characteristics of an interesting target. In the case of these figures, the satellite and sun have generally similar angles with regard to the target area 45 on the ground. In FIG. 4A, a cloud 46 is relatively close to the target 45, whereas in FIG. 4B, a cloud 47 is relatively further away from the target 45. In FIG. 4A, a substantial amount of light is reflected off of the cloud 46 to provide additional illumination on the target 45. In FIG. 4B, on the other hand, because of the relative height of the cloud 47, a much smaller (and perhaps insignificant) amount of light is reflected by the cloud 47 onto the target 45. By knowing the cloud proximity, the illumination model and classification accuracy can be improved.

One approach to determining cloud height is to take stereo pairs of images all the time. With that approach, the impact to net collection capacity is a more than factor-of-two reduction in unique images collected. Accordingly, it is preferable to avoid stereo imaging unless absolutely necessary. Taught herein are techniques for using parallax in different portions of the image sensors to determine the height of cloud features.

Figure 5A:
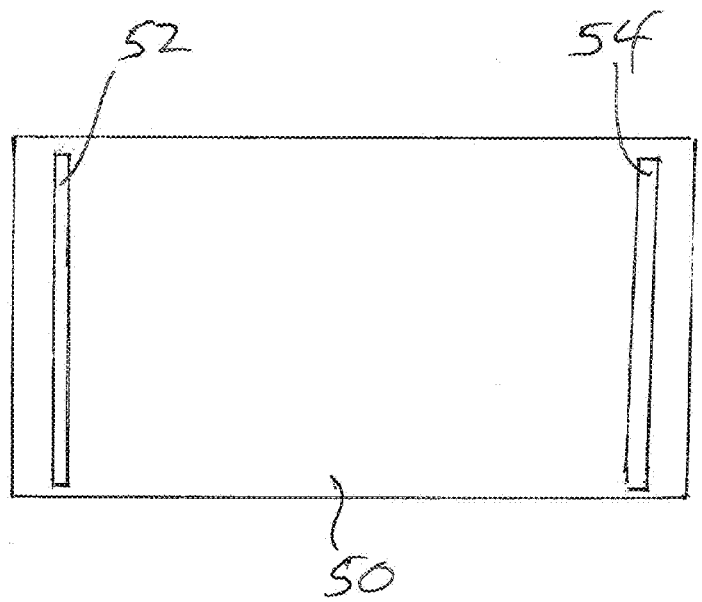
FIGS. 5A and 5B are an illustration of the relative positions and angular displacements of a pair of sensor bands on the satellite.
Figure 5B:
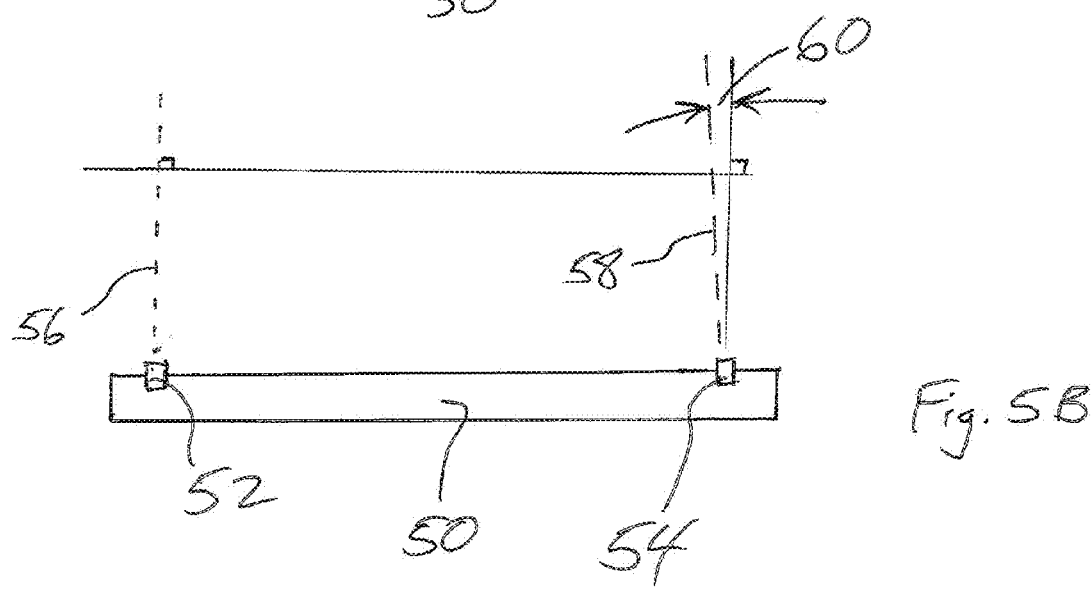

The satellite may contains many separate banks of sensors. Each bank of sensors may have one or more bands (e.g., 3-15 bands). In this case, a band is a row of pixels that may be several thousands or more wide with pixels that nominally only detect a specific portion of the electromagnetic spectrum. The bands are arranged as parallel cross-scan (a/k/a cross-image) rows of detectors. In one embodiment, one or more of the bands in one or more of the banks may be populated with VNIR sensors. VNIR has a fairly standard meaning in the industry of the portion of the electromagnetic spectrum from roughly 400 to 1100 nanometers in wavelength. In one embodiment, one or more of the bands in one or more of the banks may be populated with SWIR sensors. SWIR has a fairly standard meaning in the industry of the portion of the electromagnetic spectrum from roughly 1100 to 3000 nanometers in wavelength. In one embodiment, shown in FIGS. 5A and 5B, two of the bands 52 and 54 are identical SWIR bands that are based on the NASA MODIS Aerosol band between 2105 and 2245 nanometers. They are shown in spaced-apart fashion in a bank 50 of sensors in FIGS. 5A and 5B. The two bands 52 and 54 are designed together with the optical system of the satellite to receive radiant energy along primary axes 56 and 58, respectively. In this case, the angle between the two primary axes is shown to be represented by a parallax angle 60. The parallax angle 60 therebetween may be approximately 1.5 degrees in one embodiment. Alternatively, it may be desirable for this angular offset 60 to be approximately 0.4, degrees, 0.5 degrees, 1.0 degrees, 1.5 degrees, or 1.8 degrees (or more). As will be discussed below, this provides for a parallax that can be exploited to determine cloud feature height. Of course, any smaller or larger amount of angular offset 60 could be selected. While the parallax angle may be as great as 5 degrees, the teachings herein are intended to distinguish over parallax created by stereo images, which may be taken in the range of 30 degrees or more apart from each other.

Figure 6:
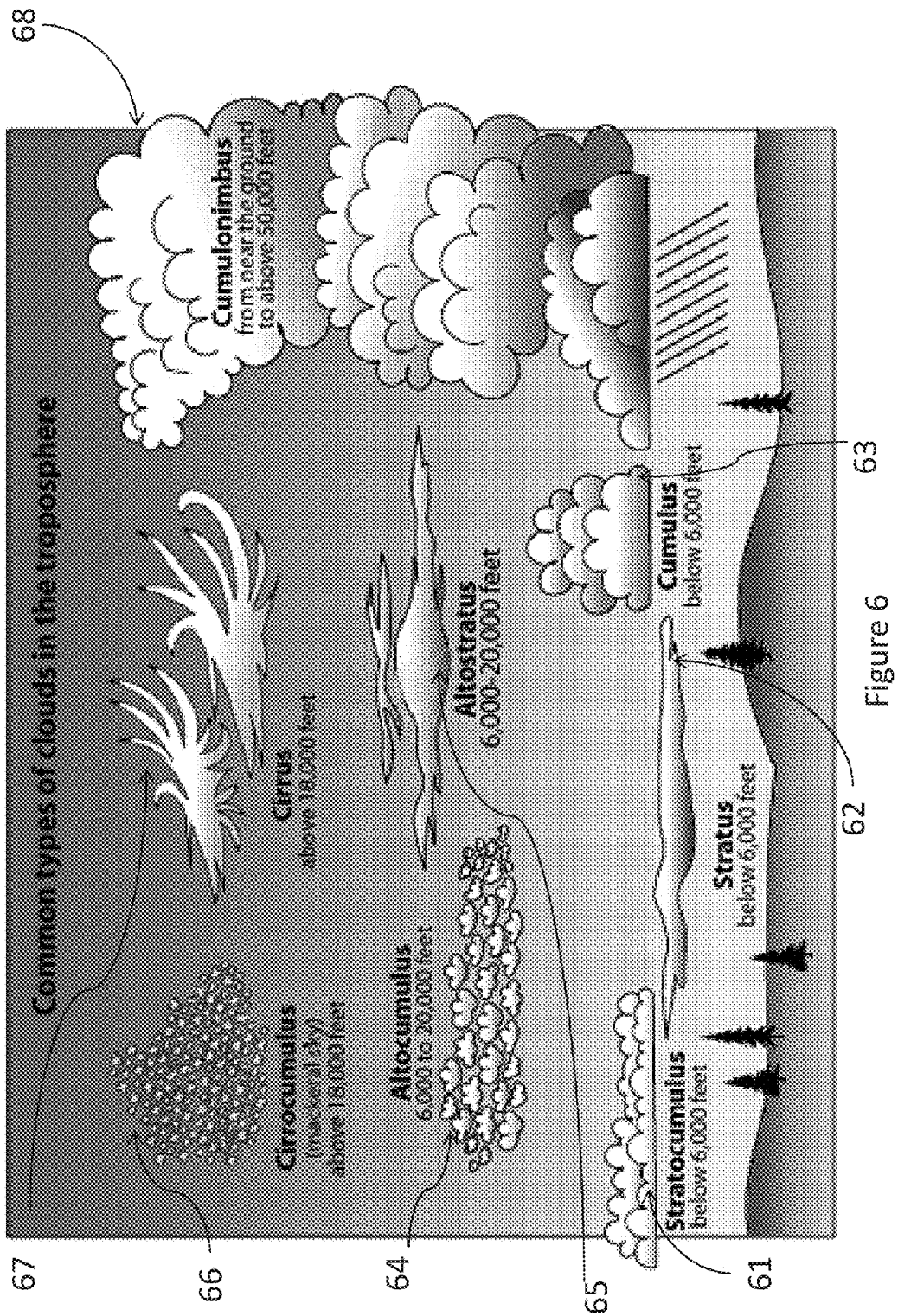
FIG. 6 is an illustration of the typical shape, size, and height of various types of clouds.

FIG. 6 shows typical cloud types and common heights. As can be seen, stratocumulus 61, stratus 62, and cumulus 63 may exist below 6,000 feet. Altocumulus 64 and altostratus 65 may exist between 6,000 and 20,000 feet. Cirrocumulus 66 and cirrus 67 may exist above 18,000 feet. Lastly, cumulonimbus 68 may exist from near the ground to over 50,000 feet.

Figure 7:
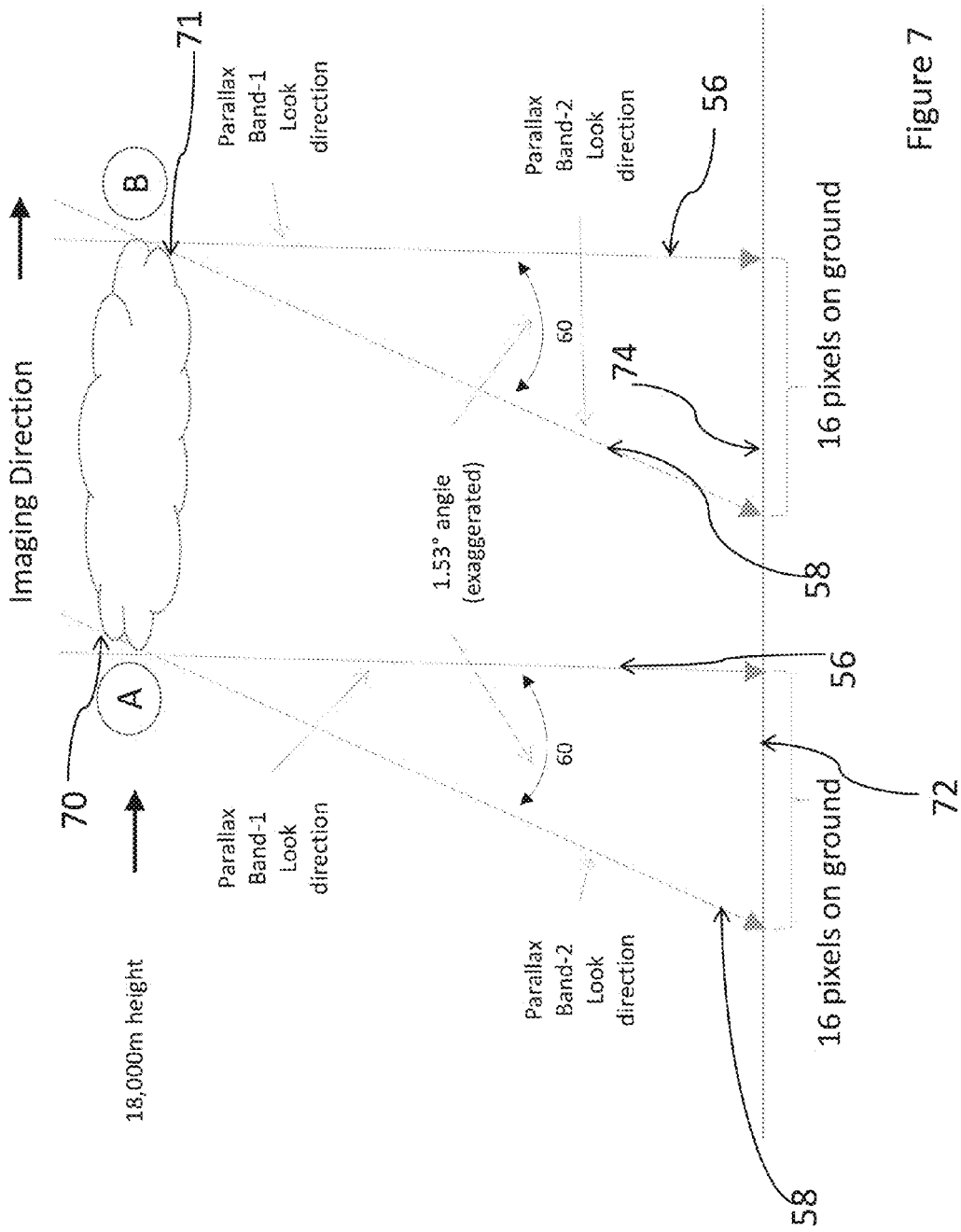
FIG. 7 is a simplified illustration showing the parallax between two particular bands of sensors on the satellite, parallax that can be exploited to calculate the height of the cloud.

FIG. 7 shows how the basic parallax band geometry allows the leading or lagging parallax band (shown by previously-described axes 56 and 58, respectively) to expose as many as sixteen pixels (assuming that they are 30 m ground spatial distance (GSD) pixels) in the imaging direction caused by viewing the leading and lagging cloud edges (70 and 71, respectively) at 18,000 m height above the ground. Pixels 72 that were hidden from the lagging parallax band 58 for the leading cloud edge 70 (identified by Circle-A in FIG. 7) are visible to the leading parallax band 56 and are used to estimate the leading cloud edge height. Pixels 74 that were exposed by the lagging parallax band 58 for the lagging cloud edge 71 (identified by Circle-B in FIG. 7) are not visible for the leading parallax band 56 and are used to estimate the lagging cloud edge height. The parallax bands can resolve cloud edge features to perhaps ¼ pixel depending on ground pixel contrast compared to the cloud pixels, enabling vertical cloud height resolution of ~300 m.

Figure 8:
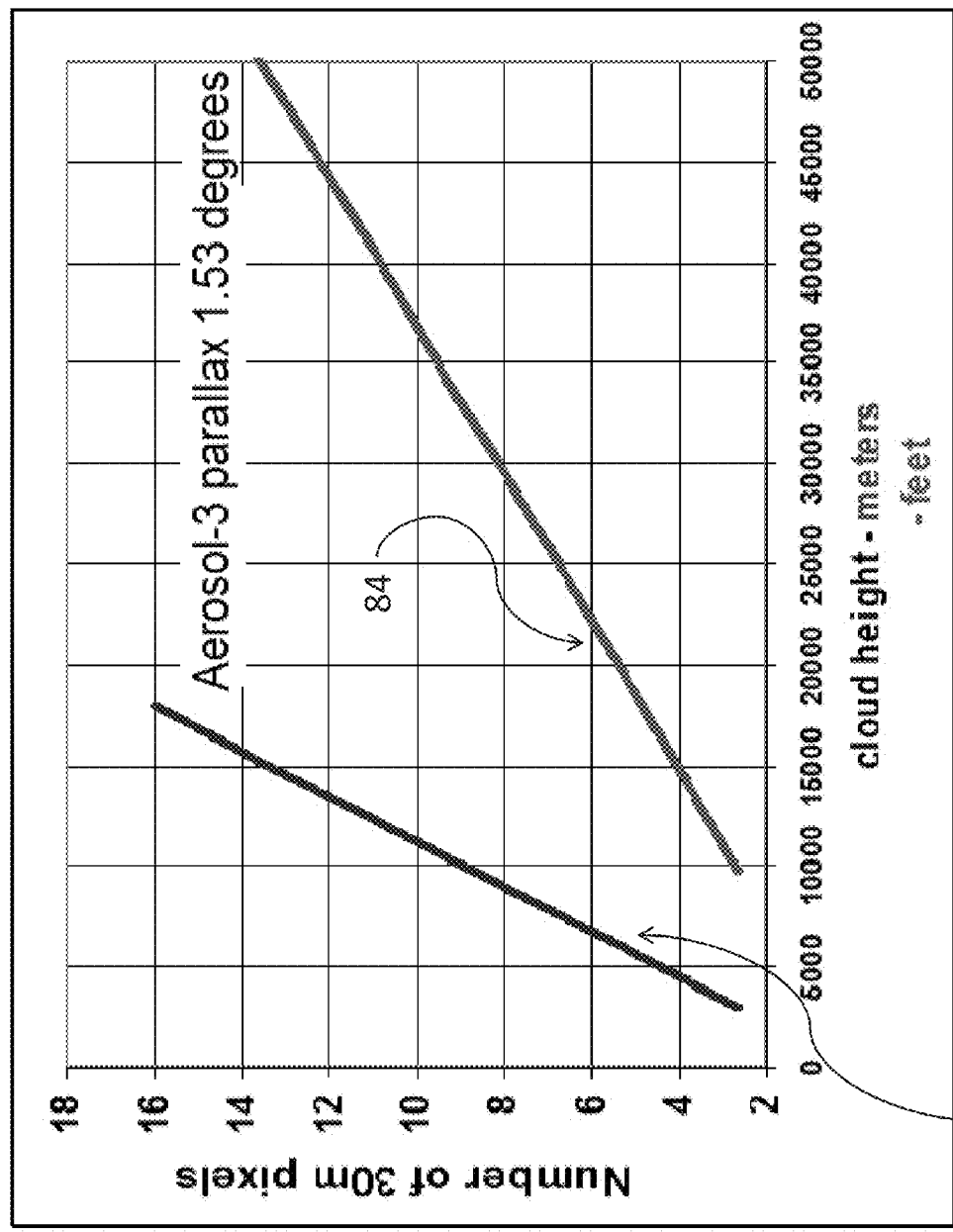
FIG. 8 is a graph illustrating the number of pixels that may be blocked by a cloud edge in a parallax situation.

FIG. 8 shows how many ground pixels are exposed or hidden as a function of height, with the curve for meters being represented by 82 and the curve for feet being represented by 84. The two parallax bands hide or expose ground pixels as a function of cloud edge height. This graph is based on the parallax amount being 1.53 degrees and the pixel size being 30 meters of GSD. As can be seen, a cloud height of approximately 5,000 meters will result in a parallax on the ground of just over 4 pixels and a cloud height of approximately 18,000 meters will result in a parallax on the ground of 16 pixels. Thus, it can be appreciated that if one were to measure the number of pixels of parallax based on a cloud edge between the satellite and the target 22, they could determine the height.

Figure 9:
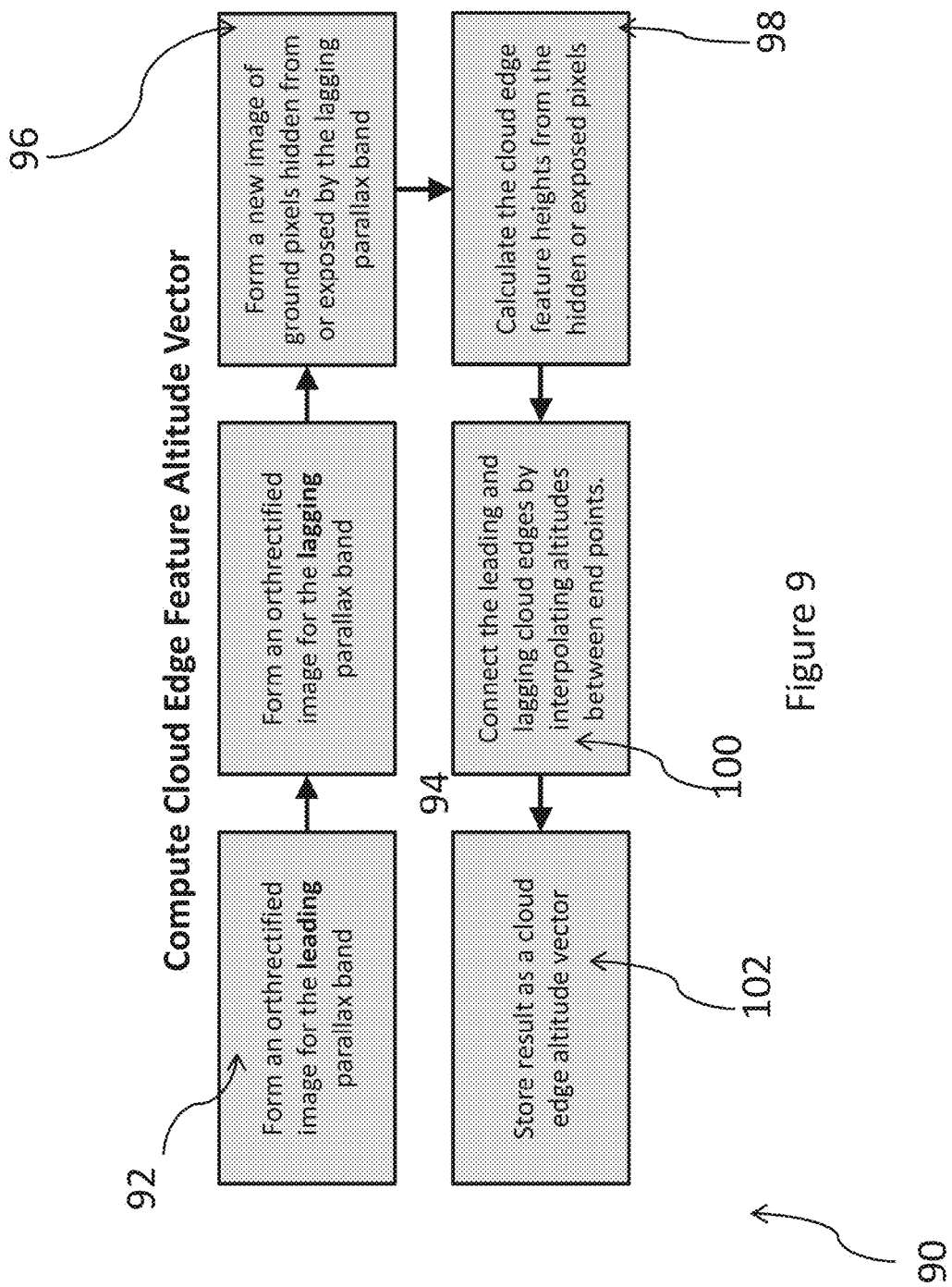
FIG. 9 is a flow diagram of an algorithm for computing a Cloud Edge Feature Height Vector.

An exemplary algorithm 90 is shown in FIG. 9. Normal image formation and registration for each band involves corrections for band look angles, actual imaging time, and topography. The method starts with formation 92 and 94 of an orthorectified image for both the leading and lagging parallax bands. As shown in 96 and 98, the in-scan length of a group of ground pixels hidden from the lagging parallax band is directly related to the height of a leading cloud edge feature for a given cross-scan image position. Similarly, the in-scan length of a group of ground pixels exposed by the lagging parallax band is directly related to the height of a lagging cloud edge feature for a given cross-scan image position.

The leading and lagging cloud edges are connected 100 by interpolating heights between the end points. The result is stored 102 as a cloud edge feature height vector (see FIGS. 10A, 10B, and 10C). This vector is a table of heights for points of arbitrary spacing that define the measured cloud edge feature. Depending on the amount of contrast between the cloud pixels and the ground pixels, it may be possible to resolve the mixing ratios to within ¼ of a pixel. This equates to a resolution of cloud edge feature height of about 300 m.

While reference has been made throughout the description to determining the height of a cloud, it is equally possible to determine the height of other things as well. Thus, we can generically refer to objects in the sky for which a height thereof can be determined. In addition, reference has been made throughout the description to the parallax bands being part of a sensor on a satellite. It should be understood that any other suitable type of vehicle could serve as the platform 20 in place of the satellite. In other words, the platform 20 could also be an aircraft, whether manned or unmanned, a balloon, a spacecraft, or other.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method of determining the height above ground of an object in the sky, comprising:
   collecting from a position above the surface of the Earth light energy coming from a first direction;
   collecting from a position above the surface of the Earth light energy coming from a second direction, wherein the second direction is not parallel to the first direction;
   comparing the light energy from the first direction and the second direction to determine when an object in the sky is encountered, and determining a measure of the difference between the light energy from the two directions when the object is encountered; and
   calculating the height above Earth of the object based on the measure of the difference;
   wherein each of the collecting operations is performed by at least one row of multiple, separate pixels, there being at least one row for the collecting in the first direction and at least one row for the collecting in the second direction.

2. A method as defined in claim 1, wherein the light energy collected from the two directions is of approximately the same wavelength.

3. A method as defined in claim 1, wherein the light energy is in the SWIR range of the electromagnetic spectrum.

4. A method as defined in claim 1, wherein the angle between the first and second directions is less than 5 degrees.

5. A method as defined in claim 1, wherein the angle between the first and second directions is within a range between 1.0 and 2.0 degrees.

6. A method as defined in claim 1, wherein the light energy is ambient light.

7. A method of determining the height above ground of an object in the sky, comprising:
   collecting from a position above the surface of the Earth light energy coming from a first direction;
   collecting from a position above the surface of the Earth light energy coming from a second direction, wherein the second direction is not parallel to the first direction;
   comparing the light energy from the first direction and the second direction to determine when an object in the sky is encountered, and determining a measure of the difference between the light energy from the two directions when the object is encountered; and
   calculating the height above Earth of the object based on the measure of the difference;
   wherein the comparing operation includes:
   comparing the light energy from the first direction and the second direction to determine when a leading edge of an object in the sky is encountered, and determining a measure of the difference between the light energy from the two directions when the leading edge is encountered;
   comparing the light energy from the first direction and the second direction to determine when a lagging edge of an object in the sky is encountered, and determining a measure of the difference between the light energy from the two directions when the lagging edge is encountered;
   and wherein the calculating operation includes:
   calculating the height of the leading edge of the object based on the measure of the difference between the light energy from the two directions when the leading edge is encountered; and
   calculating the height of the lagging edge of the object based on the measure of the difference between the light energy from the two directions when the lagging edge is encountered.

8. A method as defined in claim 7, further including:
   interpolating the height between the calculated height of the leading edge and the calculated height of the lagging edge.

9. A method as defined in claim 7, wherein the angle between the first and second directions is within a range between 1.0 and 2.0 degrees.

10. A method as defined in claim 7, wherein the light energy is ambient light.

11. A method as defined in claim 7, wherein the light energy collected from the two directions is of approximately the same wavelength.

12. A method as defined in claim 7, wherein the light energy is in the SWIR range of the electromagnetic spectrum.

13. A method as defined in claim 7, wherein the angle between the first and second directions is less than 5 degrees.

14. A method of determining the height above ground of an object in the sky, comprising:
   collecting from a position above the surface of the Earth light energy coming from a first direction;
   collecting from a position above the surface of the Earth light energy coming from a second direction, wherein the second direction is not parallel to the first direction;
   comparing the light energy from the first direction and the second direction to determine when an object in the sky is encountered, and determining a measure of the difference between the light energy from the two directions when the object is encountered; and
   calculating the height above Earth of the object based on the measure of the difference;
   wherein the determining operation of the comparing operation includes determining the number of pixels on the ground that can be seen in one of the first and second directions that cannot be seen on the ground in the other of the directions.

15. A method as defined in claim 14, wherein the pixel determination includes determining to an amount less than one pixel.

16. A method as defined in claim 14, wherein the light energy collected from the two directions is of approximately the same wavelength.

17. A method as defined in claim 14, wherein the light energy is in the SWIR range of the electromagnetic spectrum.

18. A method as defined in claim 14, wherein the angle between the first and second directions is less than 5 degrees.

19. A method as defined in claim 14, wherein the angle between the first and second directions is within a range between 1.0 and 2.0 degrees.

20. A method as defined in claim 14, wherein the light energy is ambient light.

21. A method of determining the height of a cloud, comprising:
   providing a pair of radiant energy sensors at a height greater than the cloud, the sensors being directed toward the cloud at a small parallax angle relative to each other, the parallax angle being less than 5 degrees;
   receiving radiant energy with the sensors; and
   comparing the radiant energy received by the two sensors to determine the height of the cloud.

22. A method as defined in claim 21, wherein the pair of sensors are in a single satellite.

23. A method as defined in claim 22, wherein the satellite is flying in a low Earth orbit.

24. A method as defined in claim 21, wherein the pair of sensors is in a single aircraft.

25. A method as defined in claim 24, wherein the aircraft is an unmanned vehicle.

26. A method as defined in claim 21, wherein the radiant energy is ambient radiant energy.

27. A method of determining the height above ground of an opaque cloud in the sky, comprising:
   providing a multi-band line scanning imager with first and second SWIR sensor bands that are aligned in such a way that the two bands are parallel in the cross-scan direction, but non-parallel with a small, but non-zero, parallax angle in the in-scan direction;
   collecting radiant energy with the imager from a moving above-ground platform that is further from the ground than an opaque cloud;
   forming separate ortho-rectified, co-registered SWIR images, based on collected sensor data from the first and second bands;
   forming separate ortho-rectified, co-registered classification images, based on the first and second SWIR images, that classify each pixel within each image as either opaque cloud, snow/ice, or other;
   comparing the first and second classification images to identify in-scan segments of pixels where corresponding pixels in both of the first and second classification images has been classified as opaque cloud, leading to further classification of these pixels as opaque cloud interior pixels;

comparing the first and second classification images to identify in-scan segments of pixels where corresponding pixels in one of the first and second said classification images has been classified as opaque cloud and the corresponding pixels in the other of the first and second classification images has been classified as snow/ice or other, leading to further classification of these pixels as opaque cloud edge pixels; and based on the opaque cloud edge pixels and the opaque cloud interior pixels, determining the height above ground of the opaque cloud edge pixels.

* * * * *